July 11, 1950 — M. LAMMERTSE — 2,515,128
BELT TYPE VEHICLE TRACK
Filed Jan. 10, 1946 — 3 Sheets-Sheet 1
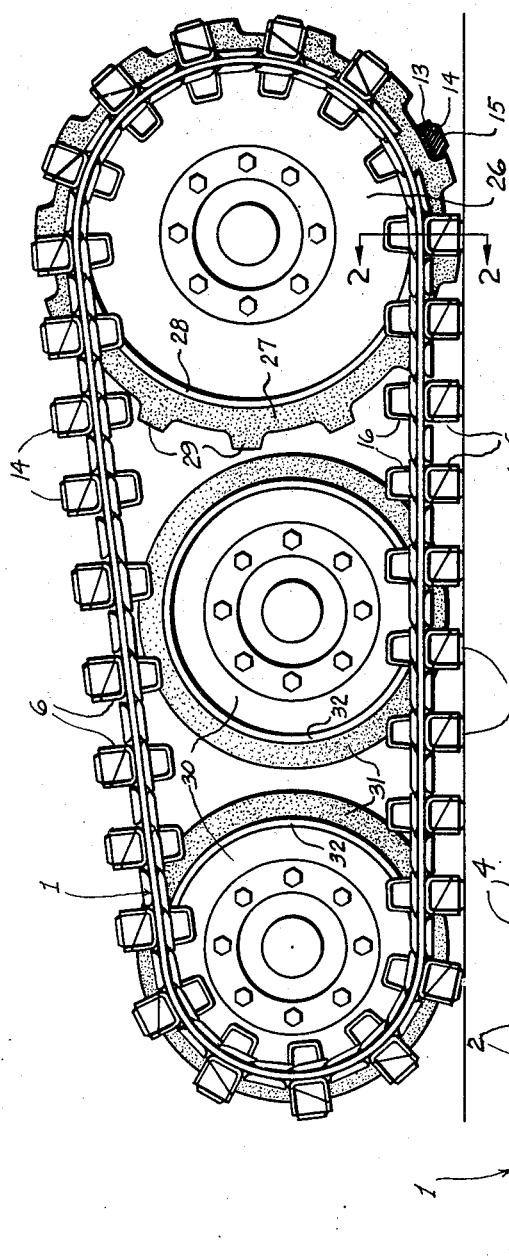
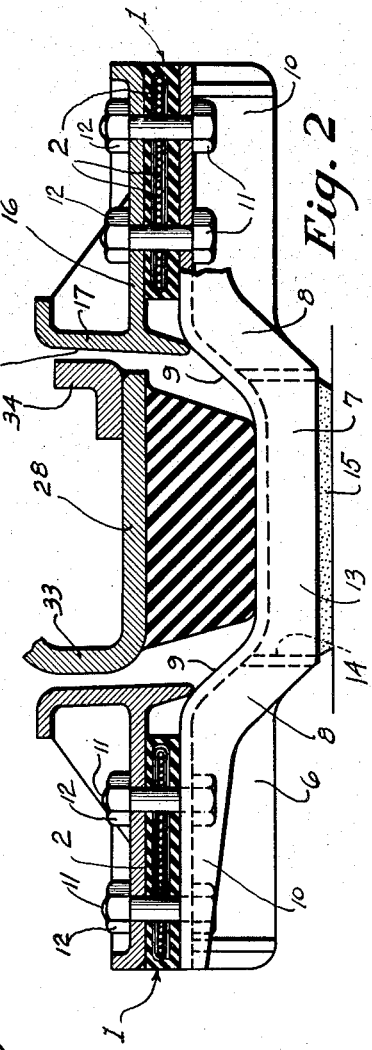
Inventor
Meindert Lammertse
By
Attorney July 11, 1950  M. LAMMERTSE  2,515,128
BELT TYPE VEHICLE TRACK Filed Jan. 10, 1946  3 Sheets-Sheet 2

Inventor
Meindert Lammertse

By
Attorney

July 11, 1950 M. LAMMERTSE 2,515,128
BELT TYPE VEHICLE TRACK
Filed Jan. 10, 1946 3 Sheets-Sheet 3

Inventor
Meindert Lammertse

By
Attorney

Patented July 11, 1950

2,515,128

UNITED STATES PATENT OFFICE 2,515,128

BELT TYPE VEHICLE TRACK

Meindert Lammertse, Cuyahoga Falls, Ohio, assignor to Wingfoot Corporation, Akron, Ohio, a corporation of Delaware Application January 10, 1946, Serial No. 640,298

5 Claims. (Cl. 305—10)

This invention relates to improvements in flexible endless tracks for track-laying vehicles. More particularly, the invention pertains to a form of flexible endless track for use on track-laying vehicles such as tractors, snow plows or other vehicles required to operate in snow, mud or soft swampy ground where a track of maximum flotation is required, and one that is equally well adapted to operate efficiently over solid, uneven terrain.

By providing a track having its longitudinal elements formed of flexible belts composed of rubberized fabric and rubber, reinforced with flexible wire cables of relatively small diameter, great flexibility is obtained without sacrificing the tensile strength of the belts.

In the course of construction of the belts, the flexible wire cables are wound in series longitudinally of the belt which provide lateral intervals, thereby providing spaces for the punching or otherwise forming bolt holes between the several series of wire reinforcements for attaching the cross members, wheel guides, torsion-resisting and belt-protecting plates without distorting or in any way disturbing the flexible cables embedded in said belts. By forming the bolt holes in the areas void of the longitudinal extending cables, the tensile strength of the belt is not impaired and the cables will retain their initial position, thus materially prolonging the life of said belts.

An object and advantage of the present invention lies in the fact that it provides a track that will be lighter in weight and possess greater flexibility than other forms of tracks which are required to operate on vehicles of a similar character.

Another object of the invention is to provide a track which affords greater flotation. By using belts of the character disclosed, a greater ground contacting area is obtained and the weight of the vehicle is distributed over a greater area which obviously will result in greater flotation.

Another object is to provide a track in which when any one element becomes broken or worn it can be easily replaced with a minimum of time and effort. Each part being a unit in itself, can be replaced without disturbing other parts with which it may be associated.

Another object of the invention is to provide belts composed of fabric and rubber having relatively small reinforcing strands of braided or twisted wire possessing sufficient tensile strength to withstand the strain and high speed to which they are subjected in use. The wire strands are embedded in the belt and are arranged in groups, said groups being spaced apart so as to leave spaces therebetween to provide for the forming of bolt holes. The spaces for the bolts are so arranged that the longitudinal tension in the belt caused by the resistance of the ground contacting grousers, will be equally distributed over the entire width of the belts.

These and other objects and advantages will be apparent when considered in connection with the following description and the accompanying drawings.

In the drawings:

Figure 1 is a side elevation of a track wherein lugged tires are used as a driving means.

Figure 2 is an enlarged cross-sectional view taken on the line 2—2 of Figure 1.

Figure 3 is a cross-sectional view of one of the belts.

Figure 4:
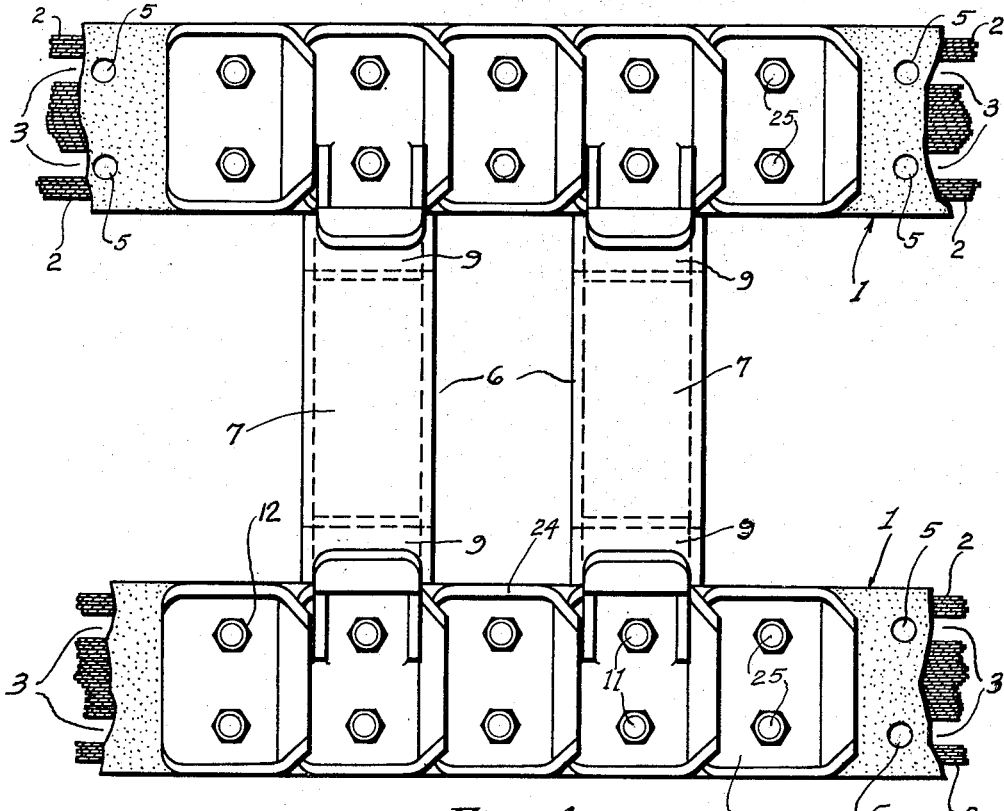
Figure 4 is a fragmentary plan view of the track.

Referring to Figure 1 of the drawings, in which one form of track is illustrated, the numeral 1 indicates a belt generally. The belt 1 is composed of rubberized fabric and rubber reinforced by wire cables 2 which are positioned in parallelism and extend longitudinally of said belt. It will be noted that the wire cables 2 are arranged in groups or series transversely of the belt leaving spaces 3 wherein no cables are present. These spaces 3 are free of wire cables but fibrous cords 4 are substituted therefor to provide even surfaces to the finished belts. The spaces 3 occupied by the cords 4 are provided for forming rows of bolt holes 5 in said belts so that the cables 2 will not be distorted or damaged when said holes 5 are formed, thereby maintaining the initial tensile strength of the belts.

Cross members or grouser bars 6 extend between the belts 1, transversely thereto and spaced apart longitudinally with respect to said belts, the spaces being in cooperative relationship to the circular pitch of the lugs of the driving wheels. The cross members 6 are formed of metal, which may be pressed steel or castings the central area of which presents an offset or depressed portion 7 and which is formed on the inner side to coincide with the contour of the treads of the driving and guide wheels. Extending upwardly and angularly from either side of the central area 7 of the cross members 6, are portions 8, the inner faces 9 of which assist in forming a guide for the guiding and driving wheels of the track. The end portions 10 of the cross members 6 extend horizontally from the angular portions 8 to the belts 1 and are attached thereto as by means of the bolts 11 and nuts 12. Portions 13 are formed on the ground contacting side of the cross members 6 and have formed therein rectangular cavities 14 wherein rubber treads 15 are inserted to provide the traction and wearing qualities of the track.

To provide a clamping means to clamp the cross members 6 to the belts 1 and to complete an efficient guide for the driving and guiding wheels of the track, combination tire guide and belt clamps 16 are mounted on the opposite side of the belts with respect to the cross members, and in alignment therewith, whereby the belts are clamped between said members by the bolts 11.

Figure 5:
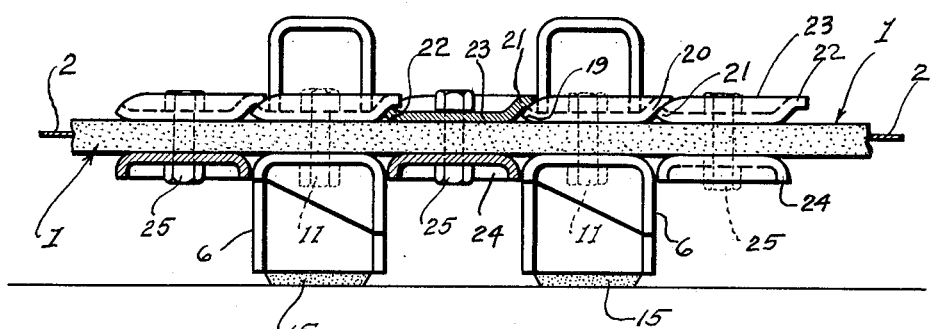
Figure 5 is a fragmentary side view of the track showing some of the members in cross-section.

The tire guide and belt clamps 16 have flanges 17 extending from their inner ends, the inward faces 18 of which are angular and coincide with the angular surface 9 of the cross member 6 and cooperate to form wheel guides to retain the track in alignment and prevent the guide wheels from leaving the track while turning, or when traveling over rough or irregular ground. The combination tire guides and belt clamps 16 are provided with offset flanges 19 and 20 formed so as to interlock with similar offset edges 21 and 22 of plates 23 (see Fig. 5). The interlocking plates 23 are positioned between the tire guides and belt clamps 16. Due to their alternating overlapping relationship interlock to absorb the torsional strain, thus causing any torsional strain on the track to be distributed throughout a greater length of the track than would be the case if they were not present. Without this interlocking feature, when the vehicles are traveling over rough uneven ground or making turns, the strain on the belts would be more localized and confined to a small area causing abrupt distortion which would tend to permit the guide or driving wheels to leave the track.

The interlocking plates 23 also serve to prevent sharp bending of the belts wherever the belts have the tendency to accumulate slackness, especially at the point just before the tracks contact the front guide wheels. The interlocking plates cause the bending of the belts at these flexing points due to slack, to be distributed through an arc having a greater radius than would otherwise be the case if the plates were not present. The action of the interlocking plates reduces fatigue of the belts at the points of flexing and prevent premature rupture of the belts at these points.

In alignment with the interlocking plates 23 and positioned on the opposite or ground contacting side of the belts 1 rectangular plates 24 are disposed on the remaining exposed portions of the belts between the ends 10 of the cross members 6. The plates 24 cooperate with the tire guides and belt clamps 16 in opposed relationship to facilitate their attachment to the belts 1 by the bolts 25. By the attachment of the plates 24, the belt clamps 16 and cross members 6 in the manner described, the belts 1 are provided with an armor of metal which will protect them from cuts and bruises when traveling over rough or uneven terrain.

The driving and guiding wheels, as shown in Figures 1 and 2 comprise driving wheels 26 consisting of tires 27 mounted on rims 28. The tires 27 having lugs 29 formed thereon for driving contact with the grouser bars 6. The guide wheels 30 comprise tires 31 mounted on rims 32 which are of the same form as the rims upon which the drive wheels are mounted. The guide wheel tires 31 require no lugs and are therefore provided with plain treads.

Figure 2 also clearly illustrates the function of the tire guides 16 to maintain the track in a central position. The tire rims 28 and 32 are so constructed that one side is provided with a vertical flange 33 which is a continuation of the rims or base bands 28 and 32. An angular ring 34 is mounted on the opposite end of the base bands 28 and 32 and welded thereto. The vertical flange 33 and the angular ring 34 cooperate with the surfaces 18 formed on the combination tire guide and belt clamp 16 to prevent the wheels of the vehicle from leaving the track.

Although solid tires have been shown and described it will be understood that pneumatic tires can be employed with equal facility in certain types of vehicles equipped with a track of the character described.

Figure 6:
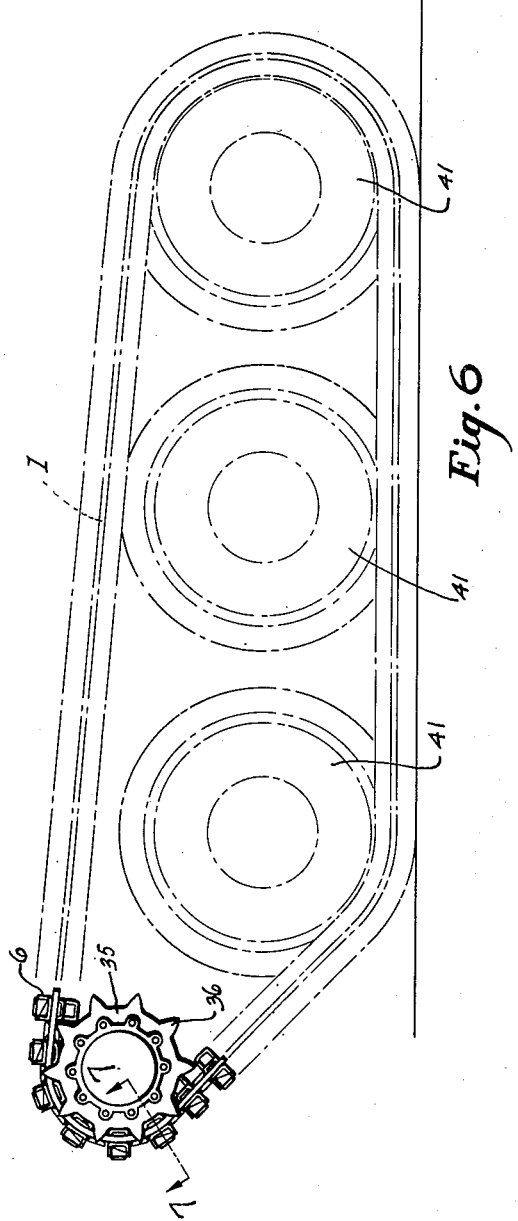
Figure 6 is a side elevation of a track wherein sprockets are used as a driving means.
Figure 7:
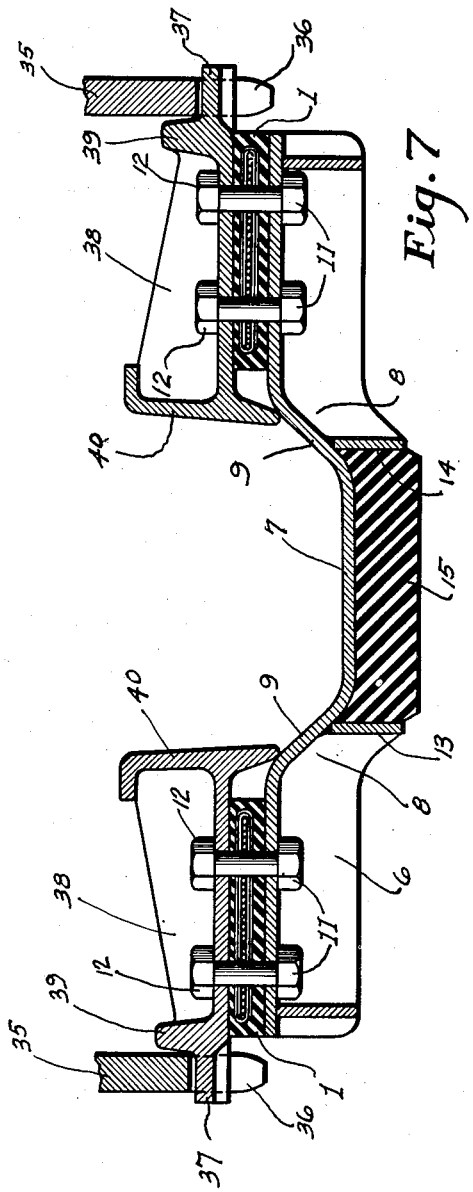
Figure 7 is an enlarged cross-sectional view taken on the line 7—7 of Figure 6.

The foregoing description has been applied especially to a half track as illustrated in Figures 1 to 5 inclusive. In Figures 6 and 7, a modification of the track embodying the teachings of the present invention is illustrated in which a full track is shown and will be described as follows. Referring to Figures 6 and 7 the track is similar to that previously described with the exception that a sprocket drive is shown and the combination belt clamp and tire guides are of slightly different design to provide lugs for contact with the teeth of sprocket wheels.

The full track comprises a pair of belts 1 having the same features previously described and incorporating cross members or grouser bars 6 which are of the same shape and form as employed on the half track. The driving medium for the full track consists of sprocket wheels 35 the teeth 36 of which engage lugs 37 formed on the outer ends of the tire guides and belt clamps 38. Adjacent said lugs flanges 39 are formed to prevent lateral movement of the track to prevent same from becoming detached from the sprocket wheels. On the inner ends of the clamps 38 angular flanges 40 are formed to aid in keeping the guide wheels 41 centered on the track.

The guide wheels 41 are of the same form and construction as shown and described for the half track but may vary in width and diameter in proportion to the size of the track required for various types of vehicles. Moreover, the tires may be of the solid type as shown or may be pneumatic but it has been found that solid tires give more practical results.

From the foregoing, it will be apparent that a practical and long wearing track has been disclosed, one which possesses a maximum of flexibility and is convenient to assemble. In addition, worn parts are easily and quickly replaced with a minimum of lost time and effort.

While in accordance with the patent statutes the best known embodiments of the invention have been illustrated and described in detail, it is to be particularly understood that the invention is not limited thereto or thereby, but that the inventive scope is defined in the appended claims.

I claim:

1. A flexible endless band track for engagement with a lugged driving wheel and a guiding wheel of a vehicle to improve its flotation characteristics with respect to the terrain it traverses and to support the weight of the same, said track comprising a pair of flexible endless reinforced belts; cross members extending between and secured at their ends to the belts in spaced relation therealong; portions on the cross members intermediate their ends for contact with the driving and guiding wheels, said portions cooperating with the driving wheel to provide meshing engagement of the lugs thereon with the spaces between the cross members to actuate the track and to afford increased distribution of the weight of the vehicle thereon; resilient tread members disposed on the opposite side of the cross members from that in contact with the guiding and driving wheels; clamping members secured to each belt in opposed relation to the cross members to clamp the belts therebetween; guide portions on the clamping members flanking the driving and guiding wheels of the vehicle; torsion resisting plates disposed on the same side of each belt as, and in alternate relation with, the clamping members, each of said plates having adjacent an edge thereof and extending substantially transversely of the belt to which it is secured an offset flanged portion which projects over the edge of one of the adjacent clamping members while the opposite edge thereof extends under a similarly offset flanged edge portion on the other adjacent clamping member to prevent excessive torsional and flexing movement of the track; and plates on the same side of the belt as the cross members and disposed in alternate relation therewith for cooperating with the torsion resisting plates to clamp the belt therebetween.

2. A flexible endless band track for engagement with a lugged driving wheel and a guiding wheel of a vehicle to improve its flotation characteristics with respect to the terrain it traverses and to support the weight of the same, said track comprising a pair of flexible endless reinforced belts; cross members extending between and secured at their ends to the belts in spaced relation therealong; depressed portions on the cross members intermediate the ends thereof defining an area of contact with the driving and guiding wheels and cooperating with the driving wheel to provide driving engagement therewith in the spaces between the cross members and to afford increased flotation of the vehicle; resilient tread members inserted in the depressed portions of the cross members on the side thereof opposite that in contact with the driving and guiding wheels; clamping members secured to each of the belts in opposed relation to the cross members to clamp the belts against the ends of the cross members; guide portions on each of the clamping members for maintaining the track in the proper lateral disposition with respect to the driving and guiding wheels; torsion resisting plates disposed on the same side of each of the belts as the clamping members and disposed in alternate relation with respect thereto; each of said plates having one edge thereof extending substantially transversely of the belt overlaying the edge of one of the adjacent clamping members while the opposite edge of the plate underlies the edge of the other adjacent clamping member to prevent excessive torsional and flexing movement of the track; and plates on the same side of the belts as the cross members and disposed in alternate relation therewith for cooperating with the torsion resisting plates to clamp the belts therebetween.

3. A flexible endless band track for mounting on the driving wheels of a vehicle to improve the flotation characteristics thereof with respect to the terrain it traverses, said track comprising a pair of flexible endless reinforced belts disposed in laterally spaced relation; cross members extending between and secured at their ends to the belts in spaced relation therealong; offset portions on the cross members between the ends thereof providing driving contact with the driving wheels and cooperating with the driving wheels to afford a greater contact area for the vehicle with respect to the terrain than that of the wheels themselves; clamping members secured to the surfaces of each of the belts opposite those to which the ends of the cross members are secured, said clamping members having projecting portions thereon for centering the track with respect to the driving wheels; torsion resisting plates mounted on the belts between the clamping members, each of said plates being arranged to overlay an edge of one of the adjacent clamping members and to underlie the edge of the other adjacent clamping member; and plates on the belts in opposed relation to the torsion resisting plates for clamping the belts therebetween.

4. A flexible endless band track for mounting on the driving wheels of a vehicle to improve the flotation characteristics thereof with respect to the terrain it traverses, said track comprising a pair of flexible endless reinforced belts disposed in laterally spaced relation; cross members extending between and secured at their ends to the belts in spaced relation therealong; depressed portions on the cross members intermediate the ends thereof providing driving engagement with the driving wheels and broadening the area of contact of the wheels with respect to the terrain, thereby increasing the flotation characteristics of the vehicle; clamping members on each of the belts at the cross members to clamp the belts therebetween, each of said clamping members having one edge thereof extending transversely of the belt provided with a flange; guide portions on the clamping members for maintaining the track in its proper driving relation to the driving wheels; torsion resisting plates secured to the belts between the clamp members, each of said plates having a projecting edge portion extending over one edge of an adjacent clamping member and another edge portion extending under the flange of the other adjacent clamping member; and plates on the belts in opposed relation to the torsion resisting plates for clamping the belts therebetween.

5. A flexible endless band track for mounting on the driving wheels of a vehicle to improve the flotation characteristics thereof with respect to the terrain it traverses, said track comprising a pair of flexible endless reinforced belts disposed in laterally spaced relation; cross members extending between and secured at their ends to the belts in spaced relation therealong; depressed portions on the cross members intermediate the ends thereof providing driving engagement with the driving wheels and broadening the area of contact of the wheels with respect to the terrain, thereby increasing the flotation characteristics of the vehicle; clamping members on each of the belts at the cross members to clamp the belts therebetween, each of said clamping members having an offset flanged portion along one of its edges extending transversely of the belt; guide portions on the clamping members for maintaining the track in its proper driving relation to the driving wheels; torsion resisting plates secured to the belt between the clamping members having offset flanged portions corresponding to those of the clamping members extending along one of the edges thereof extending transversely of the belt, the flanged portions of said clamping members and said torsion resisting plates being disposed in alternately overlapping relation with respect to adjacent torsion resisting plates and clamping members, respectively; plates on the belts in opposed relation to the torsion resisting plates for clamping the belts therebetween; and resilient tread members on the surface of the depressed portions opposite that engaging the driving wheels.

MEINDERT LAMMERTSE.

REFERENCES CITED

The following references are of record in the file of this patent:

UNITED STATES PATENTS

| Number | Name | Date |
| --- | --- | --- |
| 2,329,582 | Bishop | Sept. 14, 1943 |
| 2,392,988 | Keck | Jan. 15, 1946 |